United States Patent [19]
Baker et al.

[11] 4,081,956
[45] Apr. 4, 1978

[54] COMBINED GAS TURBINE AND STEAM TURBINE POWER PLANT

[75] Inventors: Jack M. Baker, Columbia, Mo.; Gordon W. Clark, Greenville, S.C.; Douglas M. Harper, Greenville, S.C.; Leroy O. Tomlinson, Schenectady, N.Y.

[73] Assignee: General Electric Company, Schenectady, N.Y.

[21] Appl. No.: 685,979

[22] Filed: May 13, 1976

[51] Int. Cl.² .......................... F02C 7/00; F02G 5/02
[52] U.S. Cl. ............................... 60/39.18 B; 290/40 R
[58] Field of Search .................. 60/39.18 B, 39.18 R; 122/7 R; 290/40 R

[56] References Cited

U.S. PATENT DOCUMENTS

| 3,879,616 | 4/1975 | Baker et al. | 60/39.18 B |
| 3,965,675 | 6/1976 | Martz et al. | 60/39.18 B |

FOREIGN PATENT DOCUMENTS

| 1,209,811 | 1/1966 | Germany | 60/39.18 B |
| 1,201,612 | 9/1965 | Germany | 60/39.18 B |

OTHER PUBLICATIONS

Flad, Johannes, "Combined Cycle Answers Sarrebruck's Total Energy Requirements"; Paper Presented at G. E. Gas Turbine Congress, May, 1976, Dubrovnik, Yugoslavia.

*Primary Examiner*—Carlton R. Croyle
*Assistant Examiner*—L. J. Casaregola
*Attorney, Agent, or Firm*—Erwin F. Berrier, Jr.

[57] ABSTRACT

A power plant arrangement having a gas turbine, a heat recovery steam generator, a steam turbine and means for controlling steam flow from the heat recovery steam generator to the steam turbine so that steam conditions are maintained generally constant and variations in power plant loading are carried by the steam turbine while operating the gas turbine at a generally constant fuel flow.

5 Claims, 2 Drawing Figures

COMBINED GAS TURBINE AND STEAM TURBINE POWER PLANT

This invention relates to combined gas tubine and steam turbine power plants and more particularly to a combined cycle power plant arrangement that is tolerant to rapidly fluctuating loads.

BACKGROUND OF THE INVENTION

Combined cycle power plants generally comprise a gas turbine, a steam turbine, one or more generators which are driven by the turbines and a heat recovery steam generator (HRSG) for generating steam for the steam turbine using the gas turbine exhaust gasses. In the past, such combined cycle power plants have been controlled by varying the fuel flow to the gas turbine in response to variations in the power plant load. In such an arrangement, an increase in fuel flow to the gas turbine increases gas turbine power output and increases the flow exhaust gasses from the gas turbine to the HRSG and the temperature of such gasses. This, in turn, increases the temperature of the steam generated by the HRSG and, hence, the power output of the steam turbine. Such prior arrangement has been highly satisfactory in applications that are not subject to wide swings in power plant loading. For example, such prior arrangement has been successfully applied in electrical utility applications. However, in applications where the load is subject to wide and rapid variations, as for example, where the power plant generates electricity for a steel mill having rolling mills and/or arc furnaces, such prior arrangement would result in temperature variations in the gas turbine, HRSG and steam turbine, with the possibility of creating high thermal stresses and reduced life.

A primary object of the present invention is to provide a combined cycle power plant arrangement that is tolerant of rapidly fluctuating loads.

Another object of this invention is a combined cycle power plant arrangement that can accommodate wide variations in power plant loading without producing wide temperature swings in the gas turbine. HRSG and steam turbine.

SUMMARY OF THE INVENTION

Briefly stated, the power plant arrangement of the present invention includes a gas turbine driving an electrical generator, a heat recovery steam generator for generating steam using the hot exhaust gasses from the gas turbine, a steam turbine receiving steam from the heat recovery steam generator and driving a generator, and means responsive to selected parameters of power plant operation to control the flow of steam to the steam turbine and to control the flow of steam that bypasses the steam turbine, whereby variations in power plant loading are carried by the steam turbine while maintaining steam pressure constant and while operating the gas turbine at generally constant fuel flow so as to prevent thermal cycling of the gas turbine, steam turbine and heat recovery steam generator.

BRIEF DESCRIPTION OF THE DRAWINGS

While the application concludes with claims particularly pointing out and distinctly claiming the subject matter of this invention, it is believed that the invention will be better understood upon reading the following description of the preferred embodiment in conjunction with the accompanying drawings wherein:

DESCRIPTION OF THE DRAWINGS

Figure 1:
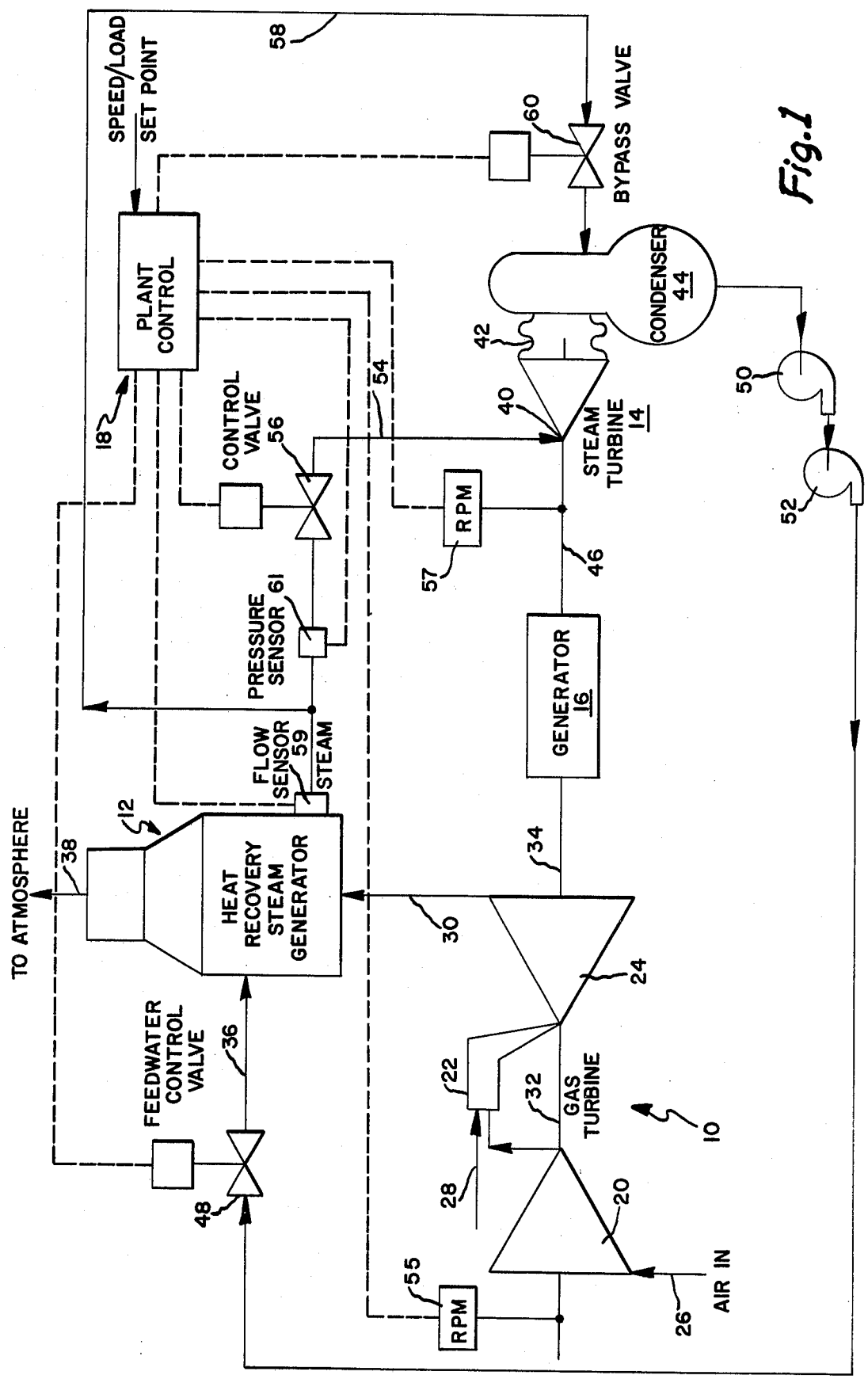
FIG. 1 is a block diagram schematically showing the combined cycle gas turbine and steam turbine power plant arrangement of this invention.

With reference now to FIG. 1 of the drawings, a combined cycle power plant has been diagrammatically shown as including a gas turbine 10, a heat recovery steam generator 12 (HRSG), a steam turbine 14, an electrical generator 16 and a plant control system 18.

The gas turbine includes a compressor 20, a combustor 22, and a turbine 24. The compressor 20 receives air from an inlet 26 and delivers compressed air to the combustor 22 which receives fuel from a suitable fuel supply system 28 and generates a hot gas stream. The hot gas stream rotatably drives the turbine 24 and is exhausted through exhaust outlet 30 to the HRSG 12. The turbine is drivingly connected to the compressor 20 and the electrical generator 16 by shafts 32 and 34, respectively.

The HRSG 12 is of the well known type that receives the hot gas stream exhaust flow at 30 and feedwater at 36 and is suitably adapted to exchange heat between these two fluids so as to generate steam. After passing through the HRSG, the gas turbine hot gas stream is exhausted to atmosphere at 38.

The steam turbine 14 includes an inlet 40 for receiving steam and an outlet 42 communicating with a condenser 44 and is drivingly connected to generator 16 by a shaft 46.

The steam condensate has been shown as being recirculated to the HRSG through a suitable valve 48 by a condensate pump 50 and a boiler feedwater pump 52.

In accordance with the present invention, means are provided to control the flow of steam to the steam turbine inlet 40 in response to power plant loading and means are provided to bypass steam from the steam turbine by directing such steam directly from the HRSG to the condenser 44 so as to maintain steam conditions generally constant in the HRSG and at the steam turbine inlet 40. Such means include a suitable conduit 54 communicating the HRSG with the steam turbine inlet 40 and a suitable conduit 58 communicating the HRSG directly with the condenser 44. A control valve 56 is provided to modulate or control the steam flow through conduit 54. Likewise a bypass valve 60 is provided to modulate or control the steam flow through conduit 58.

Figure 2:
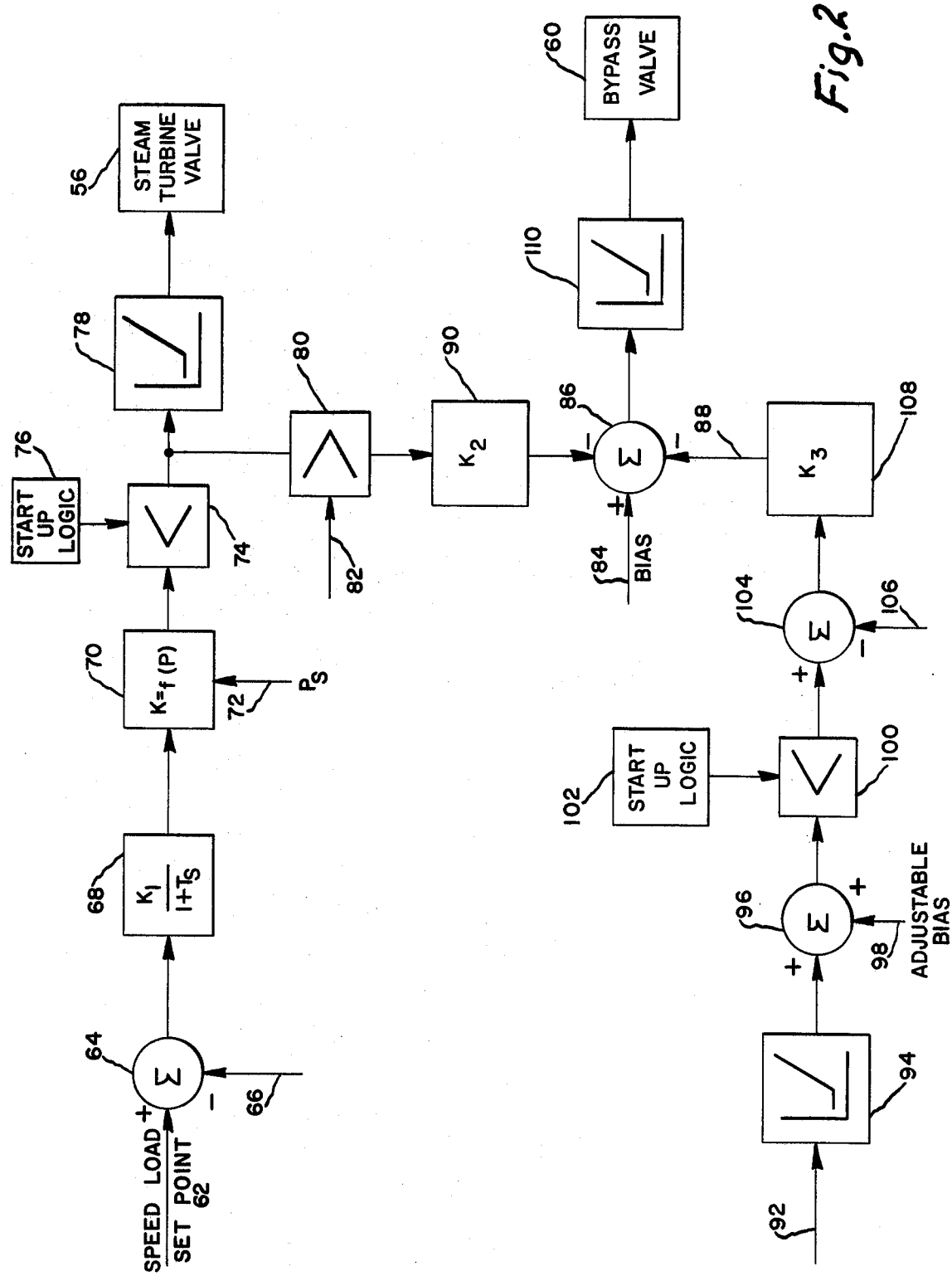
FIG. 2 is a block diagram schematically showing an exemplary means for controlling the steam supply valve and the steam bypass valve of FIG. 1.

The control means for regulating the steam valve 56 and the bypass valve 60 has been shown schematically in FIG. 2 and will be hereinafter described. A signal indicative of the desired speed/load is inputed at 62 to a summer 64 as a speed/load set point. The summer 64 also receives a signal indicative of the speed of the steam turbine 14 from speed sensor 55 or 57 at 66 and generates an error signal which is inputed to an operational amplifier 68. The operational amplifier 68 may include an R-C network having a suitable transfer function and provides the appropriate governor droop or regulation. The amplifier 68 may also include an adjustable deadband to reduce threshhold sensitivity. The signal output of the amplifier 68 is delivered to a function generator 70. The function generator 70 also receives a signal on line 72 from pressure sensor 61 which is indicative of the steam pressure in conduit 54 on the HRSG side of valve 56 and is adapted to suitably modify the signal received from amplifier 68 to compensate for the variations in steam flow that will occur as a function of steam pressure. The pressure compensated flow signal which is produced by function generator 70 is delivered to a low value gate 74 which outputs the lower of the output signal of the function generator 70 and the output signal of a suitable start up logic means 76 which generates a programmed signal to position valves 56 and 60 during power plant start up. The signal output of low value gate 74 is delivered to a function generator 78 which characterizes the flow vs. stroke for valve 56 and generates a signal to position the steam turbine control valve 56 so as to provide the called for steam flow to and, hence, power output of the steam turbine 14.

The signal output from the low value gate 74 is additionally delivered to a high value gate 80 which also receives a signal on line 82 which is of a magnitude suitable to block passage of the signal from low value gate 74 during start up and to suitably offset a bias signal which is inputed at 84 to a summer 86 so as to permit the signal on line 88 to control the position of the bypass valve 60 during power plant start up. A constant multiplier may be provided, as at 90, to provide the appropriate scaling factor to the signal output from high value gate 80 prior to inputing such signal to the summer 86.

A signal indicative of total steam flow from the HRSG is delivered at 92 to a function generator 94 from a suitable flow sensor 59. The function generator is adapted to generate a set point signal as a function of the total steam flow signal. This set point signal is inputed to a summer 96 which also receives a bias signal at 98. The bias signal provided at 98 is preferably low during normal power plant operation but is sufficiently high at power plant start up to cause a low value gate 100 to select the signal generated by a start up logic means 102. The start up logic means 102 is adapted to generate a programmed signal to appropriately position the bypass valve 60 during power plant start up.

The output of low value gate 100 is delivered to a summer 104 along with a signal on line 106 from pressure sensor 61 which is indicative of the steam pressure. The pressure error signal output from summer 104 is delivered to a suitable operational amplifier 108 which may include an R-C network to provide the appropriate transfer function and which is adapted to provide sufficient gain so that when this signal is inputed to the summer 86, a steam pressure error will override the signal from multiplier 90 and will dominate the output signal from summer 86. The output signal from summer 86 is delivered to a function generator 110. The function generator 110 is adapted to characterize the valve flow vs. stroke for the bypass valve 60 and generates a signal to position the bypass valve 60 so as to maintain the steam pressure at sensor 61 generally constant.

The use, operation and function of the present invention are as follows. After power plant start up, the fuel flow to the gas turbine 10 from the fuel delivery system 28 is maintained generally constant by suitable control means and, hence, the flow rate and temperature of the exhaust gas from the gas turbine to the HRSG 12 is maintained relatively constant. Boiler feedwater is delivered to the HRSG 12 by pumps 50 and 52 and the HRSG generates a flow of steam at lines 54, 58.

When the electrical load on the power plant or generator 16 increases or decreases, such increased or decreased load is sensed by suitable means and a signal indicative of load is inputed to summer 64. In the case of the power plant arrangement of FIG. 1, speed sensors 55 and 57 are used to detect such increased or decreased loading. In the arrangement of FIG. 1, as load increases or decreases, the speed of shafts 34, 46 changes and a speed error signal is produced by summer 64. Such speed error signal appropriately repositions steam valve 56 so as to appropriately increase or decrease the steam flow to the steam turbine inlet 40 and, hence, power output of the steam turbine.

In order to prevent variations in the pressure and temperature of the steam in the HRSG and of the steam delivered to the steam turbine, total steam flow from the HRSG should be maintained generally constant. Accordingly, as the steam turbine valve 56 is opened, bypass valve 60 is proportionately closed by the signal from multiplier 90. This action should nominally maintain the HRSG steam pressure generally constant. In the event, however, that the adjustment to the bypass valve 60 that is produced by the signal output of multiplier 90 is not sufficient to regulate steam pressure, a high gain pressure regulation loop is provided to input a signal to the summer 86 at 88 so as to provide such pressure regulation.

From the foregoing it will be appreciated that the present invention provides a combined gas turbine and steam turbine power plant that is tolerant of rapidly fluctuating loads and that can accommodate wide variations in power plant loading without producing wide temperature variations in the gas turbine, HRSG and steam turbine.

While the present invention has been depicted and described in an arrangement wherein the gas turbine 10 and steam turbine 14 drive a single generator 16, it should be understood that the invention is not so limited and that the gas turbine 10 and steam turbine 14 may each drive a different generator.

While a preferred embodiment of the invention has been depicted and described, such embodiment is intended to be exemplary only and not definitive and it will be appreciated by those skilled in the art that many substitutions, alterations and changes may be made thereto without departing from the fundamental theme of the invention.

What is claimed is:

1. A combined cycle steam and gas turbine power plant for generating electrical power to satisfy an electrical load which varies from a nominal load set point during normal operation of said power plant after power plant start-up, said power plant comprising:
    at least one gas turbine having a compressor, a combustor and a turbine arranged in serial flow relationship, said combustor adapted to receive compressed air from said compressor and fuel and generate a hot gas stream for driving said turbine, said turbine arranged in driving connection with said compressor and an electrical generator;
    a heat recovery steam generator adapted to receive the hot gas stream exhausted by said gas turbine and a supply of water and generate steam;
    a steam turbine arranged in driving connection with an electrical generator and having an inlet for receiving steam for driving said steam turbine and an outlet for discharging steam;

a first conduit for communicating steam generated by said heat recovery steam generator with said steam turbine inlet;

a second conduit for bypassing steam generated by said heat recovery steam generator from said steam turbine inlet;

a control valve disposed in said first conduit for adjusting steam flow to said steam turbine inlet;

a bypass valve disposed in said second conduit for adjusting steam flow through said second conduit;

means for sensing variations from said nominal load set point in the electrical power load to be satisfied by said power plant and for generating a load signal which is representative of said load variations;

a power plant control for controlling the electrical power generated by said power plant, said power plant control adapted to supply fuel to said gas turbine at a generally constant rate during normal operation of said power plant after power plant startup and including means, operative during normal operation of said power plant after power plant startup and responsive to said load signal, for increasing and decreasing the opening of said control valve in response, respectively, to increases and decreases in said power plant electrical load from said nominal load set point, said increase in the opening of said control valve, in the case of increases in power plant load from said nominal load set point, being sized to provide an increase in steam flow to said steam turbine which is sufficient to cause said steam turbine power output to be increased in the amount of said increase in power plant electrical load from said nominal load set point, said decrease in the opening of said control valve, in the case of decreased power plant load, being sized to provide a decrease in steam flow to the steam turbine which is sufficient to cause said steam turbine power output to be decreased in the amount of said decrease in power plant electrical load from said nominal load set point, and means for proportionately decreasing the opening of said bypass valve in response to increases in the opening of said control valve and for proportionately increasing the opening of said bypass valve in response to decreases in the opening of said control valve so that total steam flow from said heat recovery steam generator remains generally constant, whereby variations in the electrical power loading on said power plant from said nominal load set point are carried by said steam turbine and whereby the gas turbine, the heat recovery steam generator and the steam turbine are not subjected to thermal cycling as a result of such load variations.

2. The structure of claim 1 further characterized in that said means for sensing variations from said nominal load set point in the electrical power load to be satisfied by said power plant and for generating a load signal which is representative of said load variations comprises a speed sensor for sensing the rotational speed of the steam turbine generator and for generating a speed signal representative of said generator speed, and summer means for receiving a signal representative of said nominal load set point and said speed signal and for generating a signal which is representative of the difference between said set point signal and said speed signal.

3. The structure of claim 1 further characterized in that said combined cycle power plant further includes a condenser, said condenser being in flow communication with said steam turbine outlet and said second conduit so as to receive the steam flow therefrom, said condenser adapted to condense said steam flow for recirculation to said heat recovery steam generator.

4. The structure of claim 1 further characterized in that said steam turbine and said gas turbine drive a single, common generator.

5. The structure of claim 1 further characterized in that said steam turbine and said gas turbine drive separate generators.

* * * * *